United States Patent [19]

Jacaruso et al.

[11] Patent Number: 5,340,423
[45] Date of Patent: Aug. 23, 1994

[54] METHOD FOR FABRICATING A COMPOSITE STRUCTURE

[75] Inventors: Gary J. Jacaruso; Philip J. Ramey, both of Milford, Conn.

[73] Assignee: United Technologies Corporation, Hartford, Conn.

[21] Appl. No.: 933,612

[22] Filed: Aug. 21, 1992

Related U.S. Application Data

[63] Continuation of Ser. No. 727,259, Jul. 1, 1991, abandoned.

[51] Int. Cl.⁵ ............................................. B32B 31/00
[52] U.S. Cl. .................................. 156/158; 156/250; 156/267; 156/307.1; 52/743; 83/950; 425/289; 425/511
[58] Field of Search ............. 156/250, 267, 305, 307.1, 156/285; 425/289, 511; 52/806, 743; 83/914, 923, 942, 950

[56] References Cited

U.S. PATENT DOCUMENTS

| 3,230,995 | 1/1966 | Shannou | 156/166 |
| 3,666,600 | 5/1972 | Yoshino | 156/382 |
| 4,536,145 | 8/1985 | Sawyer et al. | 428/289 |
| 4,578,303 | 3/1986 | Kundinger et al. | 428/116 |
| 4,715,805 | 12/1987 | Nasu | 425/504 |

FOREIGN PATENT DOCUMENTS

| 0273608 | 12/1987 | European Pat. Off. |
| 1527959 | 8/1966 | Fed. Rep. of Germany |
| 2567799 | 7/1984 | France |
| 2598648 | 5/1986 | France |
| 8502453 | 4/1987 | Netherlands |

*Primary Examiner*—Patrick J. Ryan
*Assistant Examiner*—Merrick Dixon
*Attorney, Agent, or Firm*—Terrance J. Radke

[57] ABSTRACT

A composite forming tool is fabricated by securing shapeable filler blocks between composite headers and contouring the blocks to match the shape of the headers, to form a support structure with a continuous surface. Layers of uncured, composite laminates are laid up over the support structure and cured. The filler blocks may be removed after curing.

17 Claims, 1 Drawing Sheet

FIG. I
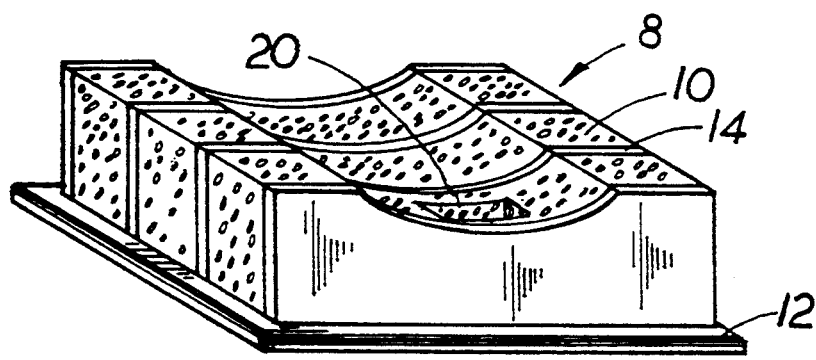
FIG. 2
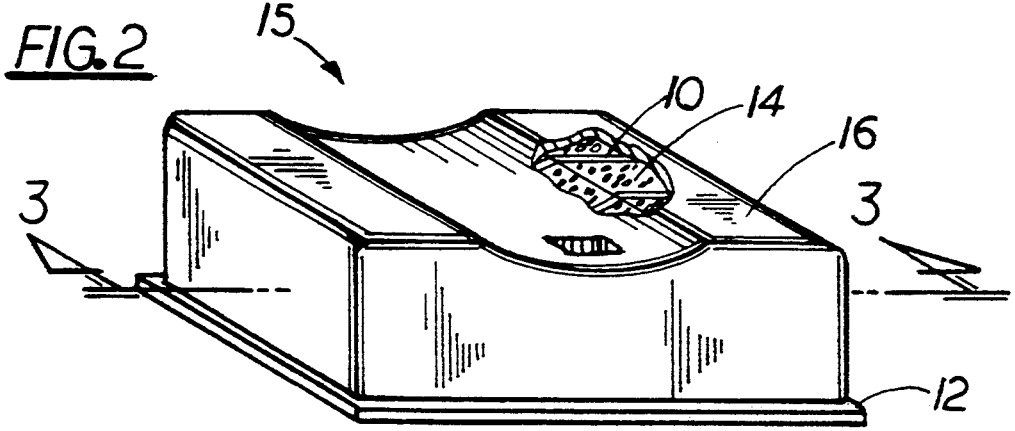
FIG. 3
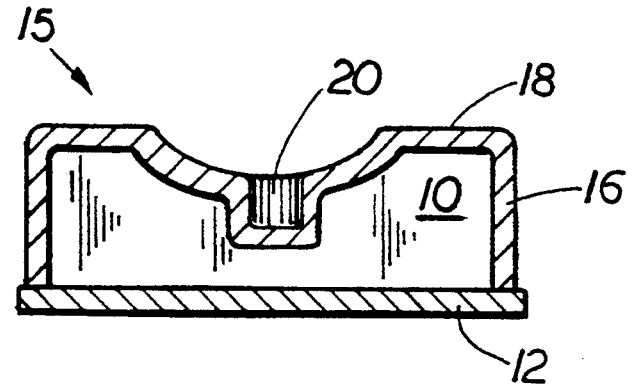

METHOD FOR FABRICATING A COMPOSITE STRUCTURE

This is a continuation application Ser. No. 07/727,259, filed Jul. 1, 1991, now abandoned.

TECHNICAL FIELD

This invention relates to composite structures, and more particularly to a method for fabricating composite forming tools.

BACKGROUND ART

Forming tools fabricated from composites have several advantages over forming tools made from more traditional materials, such as wood or metals. First, the composite forming tools are lightweight and more easily handleable. Second, and more importantly, the composite forming tools provide a match for the thermal expansion of the composite article being produced during the high temperature curing cycle. This improves the dimensional accuracy of the articles produced by the forming tool.

Fabrication of composite structure such as the composite forming tools can be a time consuming and expensive process. The current method consists of creating a master model, from wood or some other shapeable material, of the article to be produced. The master model is then used to fabricate working masters made from composite material through an intermediary process involving the use of tooling splashes made from castable material capable of withstanding the high temperatures required during the curing process. The working master is then used to fabricate the forming tool. Due to the additive nature of the tolerances involved in each step, the dimensional accuracy of the composite forming tool and therefore the article produced is significantly reduced.

An alternative method for fabricating composite forming tools was disclosed in Kundinger et al, U.S. Pat. No. 4,578,303. This method involved the use of a lattice support structure made from composite materials. Each rib or header is cut to the shape desired and the series of ribs produce the contoured surface desired for the forming tool. Several layers of laminate are placed over and bonded to the support structure during curing of the forming tool. While this method has advantages over the current method described above, it has several drawbacks which limit its use. The first is the time intensive process of cutting each of the support ribs. A second drawback is the additional weight due to using a lattice support structure. Additionally, to avoid dimpling of the layers of laminates during the curing process the ribs would have to be tightly spaced, a characteristic which multiplies the number of ribs necessary and thereby increases the weight of the tool.

DISCLOSURE OF INVENTION

An object of the invention is an improved method of fabricating a composite forming tool.

Another object of the invention is a composite forming tool used to produce an composite article with improved dimensional accuracy.

A further object is a method of fabricating a composite forming tool at a reduced cost.

According to the invention, a composite forming tool is fabricated by the following steps: first, composite headers are shaped according to the contour of the desired tool; second, filler blocks of shapeable material, contoured to match the headers, are placed between the headers to produce a support structure with a continuous surface; third, layers of uncured, composite laminates are laid up over the contoured surfaces of the support structure; finally, the composite laminates are cured. In this way a support structure is produced with a continuous surface contour defined by the headers. The continuity of the support surface eliminates the possibility of dimpling or collapsing of the laminates into the spaces between the headers during the curing of the laminates.

According further, the forming tool may be additionally contoured by, prior to laying up the laminates, removing sections of the shapeable material to form cavities or by securing additional shapeable material to the surface of the support structure to form projections.

Further, if greater dimensional accuracy is necessary, the laminates may be machined to the desired dimensional accuracy subsequent to curing.

The number of headers required, which is dependant on the complexity of the shape desired, is minimized by the use of the filler blocks as support during the curing process. Minimizing the number of headers thereby minimizes the weight of the composite tool fabricated. The weight of the forming tool may be further reduced by the removal of the filler blocks after curing.

A suggested material for the shapeable material is polystyrene foam. This material provides sufficient structural support for the laminates during curing and has the additional advantage of being easily removable after curing by dissolving the polystyrene foam using commercially available solvents.

Still further, the contouring method for matching the polystyrene foam blocks to the shape of the headers may be performed by means of hot-wire contouring. Hot-wire contouring consists of extending an electrically conductive wire between adjacent headers, passing an electrical current through the wire sufficient to heat the wire to a temperature greater than the melting temperature of the polystyrene foam, and using the headers as a template to cut away the excess polystyrene foam as the hot-wire passes over the contoured edges of the headers.

Although the invention described is particularly useful for fabricating composite forming tools, it should be understood that the invention is equally well suited to any other application in which composite structures are required.

The foregoing and other objects, features and advantages of the present invention will become more apparent in light of the following detailed description of the exemplary embodiments thereof, as illustrated in the accompanying drawings.

BRIEF DESCRIPTION OF DRAWINGS

FIG. 1 is a perspective view of a support structure prior to laying up of a layer of laminate.

FIG. 2 is a perspective view of a composite forming tool prior to dissolving the polystyrene foam.

FIG. 3 is a sectional view along line 3—3 of FIG. 2.

BEST MODE FOR CARRYING OUT THE INVENTION

Referring now to FIG. 1, a support structure 8 is comprised of a plurality of support headers 10 and a plurality of filler blocks 14 of a shapeable material. The shape of the support structure 8 is dependant on the desired shape of the composite article to be produced.

The fabrication of the support structure involves the following steps. First, the headers 10 are formed from pre-cured sheets of composite material which are cut or shaped to the desired mold contour. The composite material chosen for the headers must be suitably rigid and non-heat sensitive. A convenient method of contouring the headers 10 is to cut the sheets of composite material in accordance with station cuts taken from engineering blueprint design data of the composite article. The thickness of the headers 10 is dependant upon the size of the composite forming tool to be produced. Typically ¼" thick sheets of composite material are used to form the headers.

The headers 10 are aligned in a proper arrangement to form a ribbed support structure for the composite forming tool. Determination of the number of headers required and the proper spacing between adjacent headers depends upon the complexity of the shape desired and the length of the tool to be produced. A suggested method for maintaining the proper arrangement of headers 10 is to mount them onto a base 12, as shown in FIG. 1. Although the use of a base is suggested and shown, any other method may be used to align the headers 10, such as connecting the headers by means of a threaded rod.

The second step is to position and secure the filler blocks 14 between adjacent headers 10. The shaping of the blocks may be performed either prior to or subsequent to positioning the blocks between the headers. Securing the blocks to the headers 10 may be achieved by bonding the blocks 14 to the headers 10, or by passing a threaded rod through the headers 10 and blocks 14, or by any other convenient method. Additional shaping, such as creating cavities 20 by removing sections of the blocks or creating projections (not shown) by securing additional material to the surface, can be performed in order to account for surface features of the composite article. The blocks 14, in conjunction with the headers 10, provide a continuous support surface for the subsequent layers of laminate and will prevent dimpling or collapse of the laminates between the headers during the curing process.

A recommended material for the blocks 14 is polystyrene foam, although it should be apparent to those skilled in the art that other materials may also be applicable. Polystyrene foam has the advantages of being lightweight, easy to shape, dense enough to withstand the pressures of lay up and cure, and, although polystyrene foam does degrade upon contact with the resins associated with most uncured composites, the degradation is not significant enough to cause problems with the process. A disadvantage of polystyrene foam is that it will degrade more significantly if used during certain high temperature cures.

A suggested method for shaping the blocks 14 to the contour of the headers 10 is hot-wire contouring, which is especially applicable when polystyrene foam is used as the shapeable material for the blocks 14. In this procedure an electrically conductive wire is extended between adjacent headers 10 and an electrical current, of sufficient magnitude to raise the temperature of the wire to a temperature greater than the melting temperature of the material used for the blocks 14, is passed through the wire. The wire is then moved along the contoured edge 15 of the headers 10, cutting away the excess material of the blocks 14. In this way the contoured edges 15 of the headers are used as a template and an average contour of adjacent headers is achieved.

An alternative method to shape the blocks is to cut away the excess material and then to sand or machine the remaining material to the contour of the headers.

The final step is to lay up laminates 16 of uncured composite material directly over the contoured surface 17 of the support structure 8, as shown in FIGS. 2 and 3, and to cure the laminates 16 at the necessary temperature for the material chosen for the laminates 16. Once the laminates 16 are cured, the blocks 14 may be removed, if so desired, in order to reduce the weight of the composite tool.

An alternative to the final step is suggested for complex shapes and consists of the following steps. First, laminates 16 of a room temperature vulcanizing (RTV) composite are laid up directly over the support structure 8. Next, an impervious membrane (not shown) is placed over the entire assembly and a vacuum is drawn in order to conform the laminates 16 to the shape of the support structure 8. Finally, the laminates 16 are allowed to cure at room temperature until stabilized and then the vacuum is removed. The laminates 16 may then be post cured at higher temperatures, if necessary.

If the alternative step described above is used the blocks 14 may be removed subsequent to the room temperature curing and prior to the high temperature curing. An advantage to using polystyrene foam, or a similar material, as the material for the blocks is that it may be removed by dissolving the blocks utilizing commercially available solvents. The removal of the blocks prior to the high temperature curing eliminates the possibility of the blocks creating heat sinks during the high temperature cure.

If more precision is desired in the composite tool fabricated, the top layers of the laminates 16 may be machined subsequent to curing to provide additional dimensional accuracy. After machining the surface, a layer of gel coat may be put on the surface to smooth out any imperfections.

Although the invention has been shown and described with respect to exemplary embodiments thereof, it should be understood by those skilled in the art that various changes, omissions and additions may be made therein and thereto, without departing from the spirit and the scope of the invention.

We claim:

1. A method of fabricating a composite forming tool having a surface contour that defines a composite article to be molded utilizing said composite forming tool, said fabricating method comprising the steps of:

(a) fabricating individual support headers from suitably rigid, non-heat sensitive free standing sheets of composite material by shaping each sheet of composite material to form a contoured edge which conforms to the surface contour of a section of the composite forming tool;

(b) arranging the individual support headers to form a ribbed support structure wherein each individual support header is spaced apart from adjacent individual support headers so that the contoured edges of the arranged individual support headers corresponds to the surface contour of the composite forming tool;

(c) mounting individual filler blocks of shapeable material that is dissolvable between adjacent individual support headers such that adjacent individual filler blocks are spaced apart from one another by means of the interposed individual support headers, each individual filler block extending between adjacent individual support headers;

(d) shaping the individual filler blocks to conform to the contoured edges of the adjacent individual support headers, whereby the contoured edges of the individual support headers and the individual filler blocks in combination form a continuous support structure surface that defines the surface contour of the composite forming tool;

(e) laying up laminates of uncured composite material over the continuous support structure surface; and (f) curing the laminates to fabricate the composite forming tool.

2. The method according to claim 1, wherein the laminates of composite material are machinable after curing and further comprising an additional step of machining the laminates subsequent to the step of curing the laminates.

3. The method according to claim 1, wherein the step of shaping the filler blocks includes the steps of:

(a) extending an electrically conductive wire between adjacent individual support headers;

(b) passing an electrical current through the wire, the electrical current being of sufficient magnitude to raise the temperature of the wire to a temperature greater than the melting temperature of the individual filler blocks; and (c) moving the wire along the contoured edges of the individual support headers, thereby cutting away excess filler block to form the continuous support structure that defines the surface contour of said composite forming tool.

4. The method according to claim 1, wherein the step of mounting individual filler blocks between adjacent individual support headers is comprised of the following steps:

(a) mounting filler blocks of shapeable material between adjacent individual support headers, the individual filler blocks extending outward of the contoured edges;

(b) cutting away the excess filler block; and (c) sanding or machining the remaining filler block material to conform to the contoured edges of the individual support headers, thereby forming the continuous support structure surface that defines the surface contour of said composite forming tool.

5. The method according to claim 1, further comprising a step of removing section of the filler material prior to laying up the laminates to form cavities.

6. The method according to claim 1, further comprising a step of securing additional filler block material to the surface of the support structure surface prior to laying up the laminates to form projections.

7. The method according to claim 1, wherein the laminates are comprised of room temperature vulcanizing composite material, the filler blocks are comprised of polystyrene foam, and wherein the step of curing the laminates includes:

(a) conforming the laminates to the contour of the support structure surface by encasing the support structure and laminates in an impervious membrane and drawing a vacuum;

(b) curing the laminates at room temperature until stabilized; and (c) removing the polystyrene foam from the cured structure by dissolving the polystyrene foam with a suitable solvent.

8. The method according to claim 7, wherein the laminates of composite material are machineable after curing and further comprising an additional step of machining the laminates subsequent to the step of curing the laminates.

9. The method according to claim 7, wherein the step of mounting the individual filler blocks between adjacent individual support headers is comprised of the following steps:

(a) mounting the individual filler blocks of shapeable material between adjacent individual support headers, the individual filler blocks extending outward of the contoured edges;

(b) extending an electrically conductive wire between adjacent individual support headers;

(c) passing an electrical current through the wire, the electrical current being of sufficient magnitude to raise the temperature of the wire to a temperature greater than the melting point of the individual filler blocks; and (d) moving the wire along the contoured edges of the adjacent individual support headers, thereby cutting away excess individual filler block to form the continuous support structure surface that defines the surface contour of said composite forming tool.

10. The method according to claim 7, wherein the step of mounting the individual filler blocks between adjacent individual support headers is comprised of the following steps:

(a) mounting individual filler blocks of shapeable material between adjacent individual support headers, the individual filler blocks extending outward of the contoured edges;

(b) cutting away the excess individual filler block; and (c) sanding or machining the remaining individual filler block material to conform to the contoured edges of the individual support headers, thereby forming the continuous support structure surface that defines the surface contour of said composite forming tool.

11. The method according to claim 7, wherein a step of removing sections of the filler block material to form cavities in the support structure surface is performed prior to laying up the laminates.

12. The method according to claim 7, wherein a step of securing additional filler block material to the surface of the support structure to form projections is performed prior to laying up the laminates.

13. The method according to claim 7, wherein a step of further curing the laminates is performed subsequent to the step of removing the filler block material.

14. A method for fabricating a composite forming tool having a surface contour that defines a composite article to be molded utilizing said composite forming tool, said fabricating method comprising the steps of:

(a) fabricating individual support headers from suitably rigid, non-heat sensitive free standing sheets of composite material by shaping each sheet of composite material to form a contoured edge which conforms to the surface contour of a section of the composite forming tool;

(b) arranging the individual support headers to form a ribbed support structure wherein each individual support header is spaced apart from adjacent individual support headers so that the contoured edges of the arranged individual support headers corresponds to the surface contour of the composite forming tool;

(c) mounting individual filler blocks of shapeable material that is dissolvable between adjacent individual support headers such that individual filler blocks are spaced apart from one another by means of the interposed individual support headers, each individual filler block extending between adjacent individual support headers;

(d) extending an electrically conductive wire between adjacent individual support headers;

(e) passing an electrical current through the wire, the electrical current being of sufficient magnitude to raise the temperature of the wire to a temperature greater than the melting temperature of the individual filler blocks;

(f) moving the wire along the contoured edges of the individual support headers, thereby cutting away excess material from the individual filler blocks to form contoured edges therein, the contoured edges of the individual support headers and the individual filler blocks in combination forming a continuous support structure surface that defines the surface contour of the composite forming tool;

(g) laying up laminates of uncured composite material over the continuous support structure surface; and (h) curing the laminates to fabricate the composite forming tool.

15. The method according to claim 14, wherein a step of further curing the laminates is performed subsequent to the step of removing the individual filler block material.

16. The method of claim 15 further comprising the step of:

removing the individual filler blocks from the fabricated composite forming tool by injecting a suitable solvent into the individual filler blocks between adjacent individual support headers and permitting the solvent and the dissolved individual filler blocks to drain from the fabricated composite forming tool.

17. The method of claim 1 further comprising the step of:

removing the individual filler blocks from the fabricated composite forming tool by injecting a suitable solvent into the individual filler blocks between adjacent individual support headers and permitting the solvent and the dissolved individual filler blocks to drain from the fabricated composite forming tool.

* * * * *